US009669820B1

United States Patent
Conlon et al.

(10) Patent No.: US 9,669,820 B1
(45) Date of Patent: Jun. 6, 2017

(54) POWER PRIORITIZATION IN A VEHICLE USING MULTIPLE POWER-SOURCES

(71) Applicant: GM GLOBAL TECHNOLOGY OPERATIONS LLC, Detroit, MI (US)

(72) Inventors: Brendan M. Conlon, Rochester Hills, MI (US); Shawn H. Swales, Canton, MI (US); Michael C. Muir, Troy, MI (US); Aniket P. Kothari, Rochester Hills, MI (US); Michael V. Woon, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/097,412

(22) Filed: Apr. 13, 2016

(51) Int. Cl.
| | |
|---|---|
| *B60W 20/00* | (2016.01) |
| *B60W 20/13* | (2016.01) |
| *B60W 10/06* | (2006.01) |
| *B60W 10/08* | (2006.01) |
| *G01C 21/34* | (2006.01) |
| *G01S 19/42* | (2010.01) |

(52) U.S. Cl.
CPC ............ *B60W 20/13* (2016.01); *B60W 10/06* (2013.01); *B60W 10/08* (2013.01); *G01C 21/3469* (2013.01); *G01S 19/42* (2013.01); *B60W 2510/081* (2013.01); *B60W 2510/087* (2013.01); *B60W 2510/246* (2013.01); *B60W 2550/402* (2013.01); *B60W 2550/406* (2013.01); *B60W 2710/0677* (2013.01); *B60W 2710/086* (2013.01); *Y10S 903/93* (2013.01)

(58) Field of Classification Search
CPC ...... B60W 20/13; B60W 10/06; B60W 10/08; B60W 2550/402; B60W 2550/406; B60W 2710/0677; B60W 2710/086; B60W 2510/246; B60W 2510/087; B60W 2510/081; G01C 21/3469; G01S 19/42; Y10S 903/93
USPC .......................................... 701/22; 307/10.1
See application file for complete search history.

(56) References Cited

U.S. PATENT DOCUMENTS

| | | | |
|---|---|---|---|
| 7,012,822 B2 * | 3/2006 | Zhu ........................ | B60L 11/12 363/132 |
| 2006/0097577 A1 * | 5/2006 | Kato ................... | F02N 11/0866 307/10.1 |

(Continued)

*Primary Examiner* — Marthe Marc-Coleman
(74) *Attorney, Agent, or Firm* — Quinn IP Law

(57) ABSTRACT

A method of prioritizing power output of first and second power-sources in a vehicle includes identifying, via a controller communicating with a satellite, the vehicle's position on a specific road course. The method also includes receiving a request for total amount of power from both power-sources and determining first power-source power and available second power-source target maximum power based on the vehicle position. The method also includes determining, based on the vehicle position, a minimum energy reserve of a source configured to energize the second power-source and available second power-source power based on the determined reserve. The method also includes subtracting the first power-source power from the requested total amount of power to determine a requested second power-source power. Furthermore, the method includes comparing the available and the requested second power-source power and generating the smaller power value to minimize the time for the vehicle to traverse the road course.

20 Claims, 3 Drawing Sheets

(56) References Cited

U.S. PATENT DOCUMENTS

| | | | |
|---|---|---|---|
| 2008/0046140 A1* | 2/2008 | Pallottini | B60L 11/1803 |
| | | | 701/22 |
| 2011/0288710 A1* | 11/2011 | Ito | B60L 11/123 |
| | | | 701/22 |
| 2016/0052505 A1* | 2/2016 | Zhou | B60L 7/14 |
| | | | 701/22 |

* cited by examiner

POWER PRIORITIZATION IN A VEHICLE USING MULTIPLE POWER-SOURCES

TECHNICAL FIELD

The disclosure relates to a system and a method for prioritizing and controlling power generated by multiple power-sources in a vehicle.

BACKGROUND

A motor vehicle may employ a single or multiple power-sources. Such vehicles can either employ a powertrain where internal combustion engine(s) are used to propel the vehicle, or a hybrid powertrain, where two or more distinct power-sources, are used to accomplish the same task. In a wheeled motor vehicle having multiple power-sources, the individual power-sources can be used to power different wheels.

In such a hybrid powertrain, an internal combustion engine can be used as the main power-source and an electric motor can be used as an auxiliary power-source. To maximize fuel efficiency of such a powertrain, at least one of the power-sources may be shut off when little or no powertrain torque is required for driving the vehicle. Such a situation may be encountered when the subject vehicle is maintaining a steady cruising speed, is in a coast down mode, i.e., when the vehicle is decelerating from elevated speeds, or the vehicle is stopped.

Also, the auxiliary power-source, such as the electric motor, can be operated in addition to the main power-source, such as the internal combustion engine, to selectively maximize output of the powertrain when such increased output can be used effectively to power the vehicle. In other words, the auxiliary power-source can be used to selectively augment power generated by main power-source to boost acceleration of the vehicle when warranted by the presence of such limiting factors as g-forces acting on the vehicle and road conditions or wheel traction.

SUMMARY

A method of prioritizing power output of first and second power-sources in a vehicle includes identifying, via a controller communicating with a satellite, a current vehicle position on a specific road course. The method additionally includes receiving a request for a total amount of power production by the first and second power-sources. The method additionally includes determining current available power production by the first power-source and a target maximum power of the second power-source in response to the identified current vehicle position. The method also includes determining a state of charge and a minimum energy reserve of an energy source configured to energize the second power-source in response to the identified current position of the vehicle.

The method additionally includes determining an available power production by the second power-source in response to the determined minimum energy reserve and the state of charge of the energy source. The method also includes subtracting the current available power production by the first power-source from the requested total amount of power production to determine a requested power production by the second power-source. Furthermore, the method includes comparing the available and the requested power of the second power-source and generating the smaller of the available and the requested power to minimize an amount of time for the vehicle to traverse the entire road course.

The vehicle can be all-wheel-drive. In such a case, the first power-source can be operatively connected to a first set of wheels of the vehicle and the second power-source can be operatively connected to a second set of wheels of the vehicle. In such a vehicle structure the first and second power-sources can operate independently.

The method may also include assessing, via the controller, an existence of a constraint that limits the current available power production by the first power-source and the available power production by second power-source after the request for the total amount of power production by the first and second power-sources has been received.

The constraint limiting the current available power production by the first power-source and the available power production by second power-source can be a traction limit at one of the respective first and second sets of wheels.

The method may also include determining, via the controller, a road speed of the vehicle on the road course. In such a case, the act of determining the maximum target power production by the second power-source can be additionally accomplished in response to the determined road speed of the vehicle.

The method may additionally include the controller using the determined road speed of the vehicle to update the current position of the vehicle on the road course.

The method may also include assessing, via the controller, an existence of a constraint limiting power production by the second power-source.

The act of determining the available power production by the second power-source can be additionally accomplished in response to the assessed constraint limiting power production by the second power-source.

According to the disclosure, the first power-source can be an internal combustion engine and the second power-source can be an electric motor.

The constraint that limits power production by the electric motor can be a temperature of the electric battery, temperature of the controller, temperature of the electric motor, or a rotating speed of the electric motor.

A vehicle employing a controller configured to perform the above method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
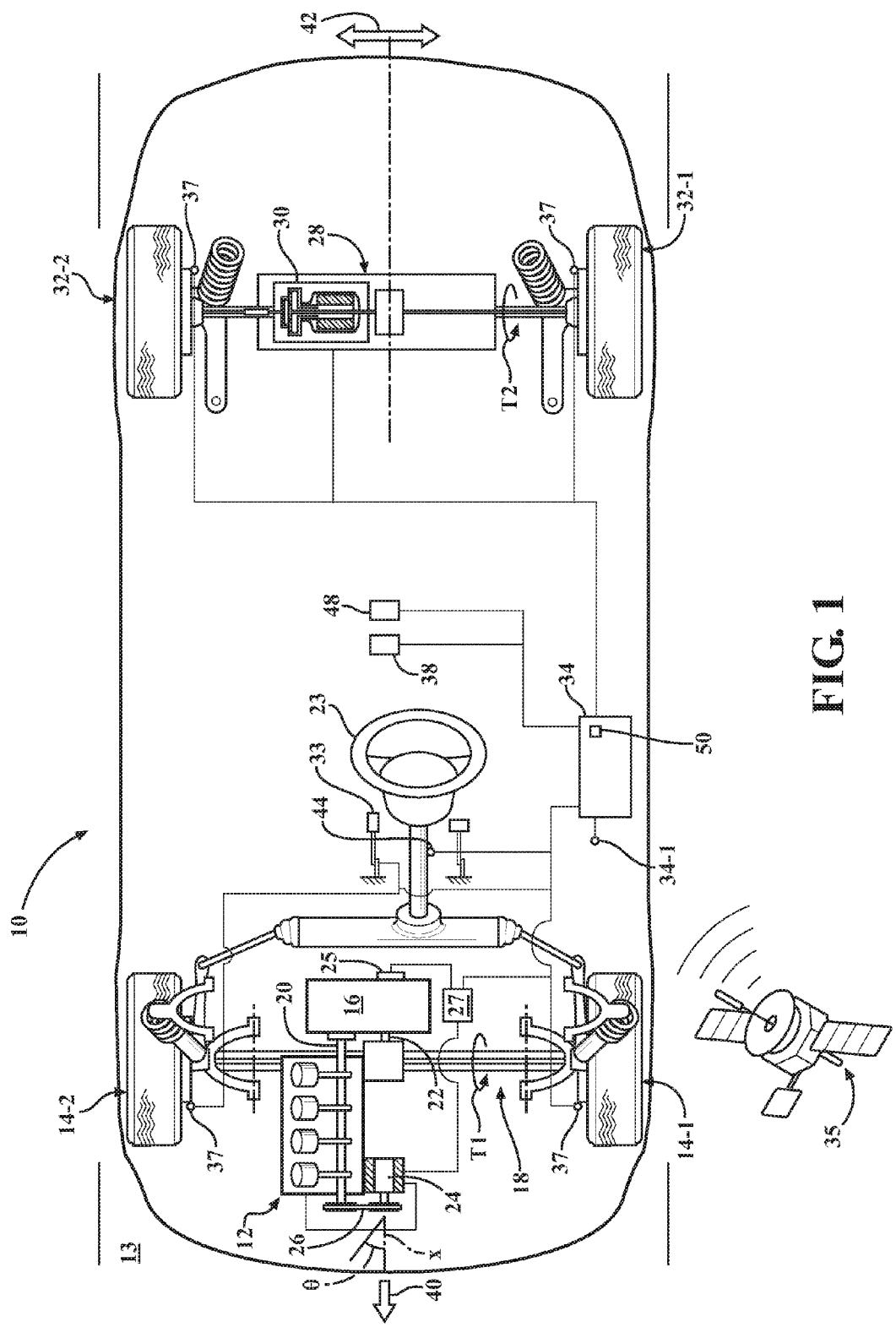
FIG. 1 is a schematic illustration of a vehicle employing multiple power-sources according to the disclosure.

Referring to the drawings in which like elements are identified with identical numerals throughout, FIG. 1 illustrates a vehicle 10 having multiple power-sources operatively connected to independent sets of driven wheels in order to provide on-demand all-wheel-drive propulsion. The vehicle 10 includes a first power-source shown as an internal combustion engine 12 configured to generate engine power P1 and torque T1 to drive the vehicle via a first set of wheels 14. As shown, the first set of wheels 14 includes a first or left-side wheel 14-1 and a second or right-side wheel 14-2 for transmitting engine output torque T1 to a road surface 13 through a transmission 16 and a first axle 18.

As contemplated herein, the transmission 16 may be a multi-speed automatically-shiftable transmission that utilizes a gear train and multiple torque transmitting devices to generate discrete gear ratios between an input 20 and an output 22 of the transmission, or a continuously variable transmission (CVT). The vehicle 10 also includes a steering wheel 23 configured to control a direction of the vehicle via turning the first set of wheels 14 through an input of a specific steering wheel angle. Although the first set of wheels 14 is depicted in FIG. 1 as a set of front wheels, nothing precludes the first set of wheels being rear wheels in the vehicle 10.

As shown, the first power-source 12 can additionally include a first motor-generator 24. In the example embodiment, the first motor-generator 24 may be configured as an integrated starter-generator (ISG) or a 12-volt stop-start motor. The ISG contemplated herein is a 36-volt or greater motor-generator that is connected directly to the engine 12 via a belt 26 and receives its electrical energy from an energy source 27, for example, an energy storage device, such as one or more batteries. As shown, the first motor-generator 24 is used for quickly starting and spinning the engine 12 up to operating speeds as part of an engine stop-start arrangement. In some embodiments of the vehicle 10, the first motor-generator 24 can be used to augment the power P1 and torque T1 of the first power-source 12. Additionally, the first motor-generator 24 may be used for generating electrical energy for use by accessories (not shown) of the vehicle 10, such as power steering and a heating ventilation and air conditioning (HVAC) system. As shown in FIG. 1, the energy storage device 27 also provides electrical power to operate an auxiliary fluid pump 25 to apply the torque transmitting devices in preparation for the engine 12 to be restarted by the first motor-generator 24.

The vehicle 10 additionally includes a second axle 28. The second axle 28 is operatively independent from the engine 12, the transmission 16, and the first motor-generator 24. The second axle 28 includes a second power-source configured as a second motor-generator 30. The second motor-generator 30 is configured to generate power P2 and torque T2 to drive the vehicle 10 via a second set of wheels 32, which includes a first or left-side wheel 32-1 and a second or right-side wheel 32-2. Although the second set of wheels 32 is depicted in FIG. 1 as a set of rear wheels, nothing precludes the first set of wheels being front wheels in the vehicle 10. The second motor-generator 30 receives its electrical energy from the energy storage device 27. Accordingly, the second motor-generator 30 is configured to drive the vehicle 10 via motor-generator output power P2 and torque T2 independently from the first power-source, including the engine 12 and the first motor-generator 24 to provide the vehicle 10 with an on-demand electric axle drive. As understood by those skilled in the art, the amount of power generated by such power-sources as 12 and 30 is a product of a measured torque output and the instantaneous rotating speed of the respective power-source. As such, power output P1 and power output P2, as well as permutations thereof to be discussed in detail below, of the respective first power-source 12 and the second power-source 30 are not specifically indicated in the Figures.

The driving of vehicle 10 solely via the second motor-generator 30 results in the vehicle being operated in a purely electric vehicle or "EV" mode. Furthermore, when both first and second axles 18, 28 are driven by their respective power-sources, the engine 12 and the second motor-generator 30, the vehicle 10 is endowed with all-wheel-drive. Generally, the electric all-wheel-drive system of the vehicle 10 with its attendant first and second axles 18, 28 is arranged longitudinally along a vehicle axis X. Accordingly, the vehicle 10 includes on-demand all-wheel-drive propulsion that may be provided via the independently operating engine 12 and second motor-generator 30. Although the remainder of the disclosure specifically describes the vehicle 10 using the engine 12 and the second motor-generator 30, the vehicle 10 is not limited to such specific independent first and second power-sources.

During operation, the vehicle 10 may be driven solely by the second motor-generator 30 while the engine 12 is shut off and the transmission 16 is placed in neutral in order to conserve fuel and improve the vehicle's operating efficiency. The engine 12 may, for example, be shut off when the vehicle 10 is maintaining a steady cruising speed which may be sustained solely by the power P2 and torque T2 output of the second motor-generator 30. Additionally, the engine 12 may be shut off when the vehicle 10 is in a coast down mode, i.e., when the vehicle is decelerating from elevated speeds, or when the vehicle is stopped. In a situation when the vehicle 10 is maintaining a steady cruising speed, the engine 12 may at any moment be restarted to participate in driving the vehicle. In order to participate in driving the vehicle 10, the engine 12 will be called upon to generate an appropriate level of engine torque T1 that will result in a desired level of transmission output torque, i.e., transmission torque at the output 22.

The desired level of transmission output torque may be representative of whether the vehicle 10 is to be driven in an electric all-wheel-drive mode or in an engine-only drive mode. When the vehicle 10 is to be driven in the electric all-wheel-drive mode after the engine restart, the desired level of transmission output torque is determined in response to a request generated by the vehicle's operator. Such an operator request can, for example, be identified by a position of a vehicle accelerator pedal 33, as detected by an appropriate sensor 33-1. A situation may develop when the vehicle 10 experiences traction loss at one or more of the drive wheels, which may take place in the first set of wheels 14 and/or the second set of wheels 32. Such traction loss may be a result of driving demands of the vehicle's operator, such as rapid acceleration from a stop or powering around a turn, which may cause an unloading and slipping of an inside wheel, and/or road conditions, such as inclement weather or a loose road surface 13. Accordingly, having drive torque simultaneously transmitted to both first and second sets of wheels 14, 32 may be advantageous for meeting demands of the operator. Such a situation may develop when a state of charge of the energy storage device 27 is below a predetermined threshold value that is sufficient to operate the second motor-generator 30. Such a predetermined minimum value of the state of charge may, for example, be 10% of a maximum amount of stored charge. As understood by those skilled in the art, the energy storage device 27 may be recharged either via a dedicated alternator (not shown) or via regenerative braking, i.e., by operating the second motor-generator 30 in energy generation mode. Additionally, the energy storage device 27 can also be recharged via the first motor generator 24. Although a diagram depicting specific connections between various system components of the vehicle 10 is shown in FIG. 1, other configurations of the vehicle not departing from the focus of the present disclosure are also envisioned.

The vehicle 10 also includes a controller 34 that is responsible for accomplishing the flying start of the engine 12 and phasing in of engine torque T1 for driving the vehicle. As envisioned herein, the controller 34 may include a central processing unit (CPU) employed to regulate and coordinate the hybrid propulsion of the vehicle 10 which includes the operation of the engine 12, the transmission 16, and the first and second motor-generators 24, 30. The controller 34 is also configured to prioritize power generation of the engine 12 and the second motor-generator 30 to propel the vehicle 10 more effectively under various road conditions. The controller 34 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 34 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 34 may also include a floppy disk, a flexible disk, hard disk, magnetic tape, any other magnetic medium, a CD-ROM, DVD, any other optical medium, etc. The controller 34 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 34 or accessible thereby may be stored in the memory and automatically executed to provide the required functionality.

The controller 34 is configured to receive a request for the engine 12 to be started when the vehicle 10 is being driven solely via the second motor-generator 30. The controller 34 is also configured to control the engine 12 to generate the desired level of transmission output torque according to whether the vehicle 10 is to be driven in the electric all-wheel-drive mode or in the engine-only drive mode. Additionally, the controller 34 may be programmed to control the application of fluid pressure required to lock-up individual torque transmitting devices inside the transmission 16 in order to place the transmission into a particular gear ratio. The controller 34 may also be programmed to determine a desired engine speed and a gear ratio in the transmission 16 according to the desired level of transmission output torque. For example, the desired speed of the engine 12 and the appropriate gear ratio in the transmission 16 may be selected from a table of mapped data that was gathered during testing and development of the vehicle 10. Such a table of mapped data may also be programmed into the controller 34 for the desired level of transmission output torque to be cross-referenced by the controller against the torque curve of the engine 12, allowable engine speeds, and transmission gear ratios at the present speed of the vehicle 10. Accordingly, the controller 34 may then select the most efficient combination of gear ratio, engine speed, and engine fueling to generate the desired level of transmission output torque for driving the vehicle 10 in response to the received request for the engine 12 to be restarted.

Figure 2:
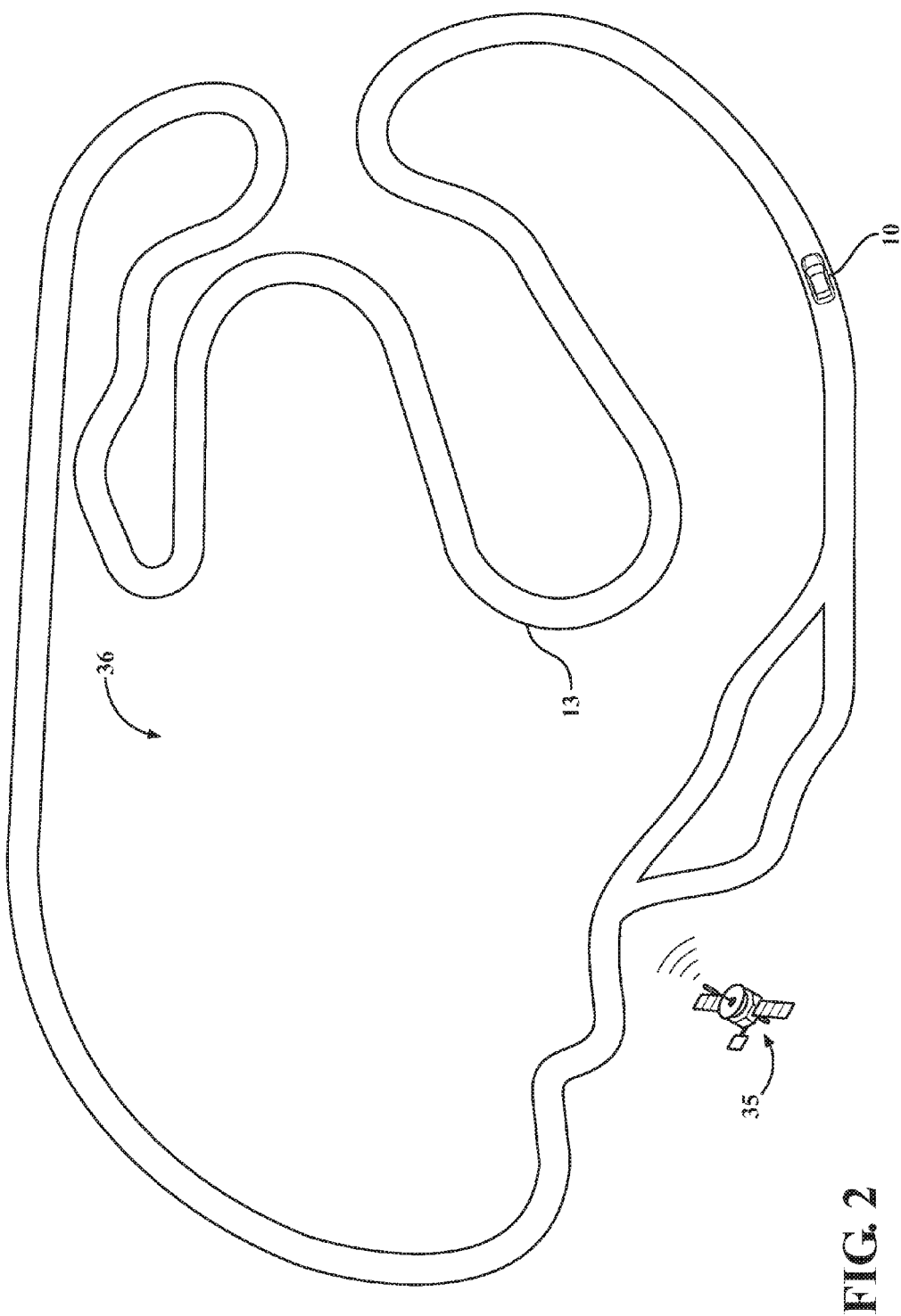
FIG. 2 schematically illustrates the vehicle shown in FIG. 1 positioned on a road course.

The controller 34 is in communication with an Earth-orbiting satellite(s) 35, such as via an antenna 34-1. The controller 34 is configured or programmed to identify in real-time a road course 36 (shown in FIG. 2), such as a racetrack, which includes the road surface 13 on which the vehicle is being driven. The controller 34 is also configured to identify a current position of the vehicle 10, such as via a Global Positioning System (GPS) coordinates, on the subject road course 36 via the satellite(s) 35, when the vehicle is being driven via the power P1 and torque T1 produced by the first power-source, i.e., the engine 12. During operation of the vehicle 10, the controller 34 monitors the state of charge of the energy source 27. The controller 34 is also configured to determine a maximum target power production $P2_{MAX}$ by the second power-source, i.e., the second motor-generator 30, in response to the identified current position of the vehicle 10. The controller 34 is additionally configured to determine a minimum energy reserve $E_{MIN}$ of the energy source 27 required to energize the second power-source 30 at the identified current position received from the satellite 35 to complete a full lap of the road course 36 using a minimum amount of time.

The above-noted minimum energy reserve $E_{MIN}$ is the threshold value of energy at which it becomes optimal to assist powering the vehicle 10 with the second power-source 30. At each position on the road course 36, there is a tradeoff between using energy at the current position and reserving it for use at a future position which provides additional opportunity to reduce lap time. With higher SOC of the energy source 27, the tradeoff becomes more favorable as the return at future positions diminishes, until, at some point, the remaining energy of the energy source exceeds the total energy needed for power assists between the current position and the end of the road course 36. The value of $E_{MIN}$ at each position on the road course 36 represents the amount of remaining energy of the energy source 27 at which it becomes desirable to boost acceleration of the vehicle 10 via the second power-source 30, because there is no better position to use the energy before the lap is completed. In other words, $E_{MIN}$ represents the energy reserve needed to assist in powering the vehicle 10 at all points on the road course 36 between the current position and the end of the course where such power assist would contribute more effectively than at the current position to reducing the total lap time i.e., contribution to reduced total lap time per unit energy used. To optimize lap time of the vehicle 10 on the specific road course 36, the controller 34 may also be programmed with a look-up table 50, which can be configured as a map or a chart of the $P2_{MAX}$ and $E_{MIN}$ as a function of vehicle position for the subject road course.

The controller 34 is also configured to determine an amount of power available $P2_A$ from the second power-source 30 based on the minimum energy reserve $E_{MIN}$ of the energy source 27. Such available power $P2_A$ will be zero when remaining state of charge of the energy source 27 is less than the value of $E_{MIN}$, and is otherwise at or below the determined maximum target power production $P2_{MAX}$ by the second power-source 30. The controller 34 may additionally use measured data of the vehicle 10, such as speed and/or acceleration, to update position information in conjunction with position data received from the satellite 35. Such measured vehicle 10 can be used by the controller 34 to improve accuracy of the determined position, and may also be used to determine or update the position of the vehicle on the road course 36 when the satellite 35 signal is temporarily unavailable due to obstruction or other interference.

The controller 34 is additionally configured to receive an operator request, for a total amount of power $P_T$ production by both the first and second power-sources 12 and 30. For example, the total amount of power $P_T$ requested by the operator may be identified in response to a position of the vehicle accelerator pedal 33 detected by the sensor 33-1 and communicated to the controller 34. The controller 34 is also configured to subtract the current power P1 produced by the first power-source 12 from the requested total amount of power production $P_T$ to determine a requested power production $P2_R$ by the second power-source 30. Specifically, the amount of power P1 currently being produced by the first power-source 12 in response to $P_T$ is the maximum power currently available from the first power-source that does not exceed $P_T$. Furthermore, the controller 34 is configured to compare the available power production $P2_A$ and the determined requested power production $P2_R$ by the second power-source 30 and regulate the second power-source to generate thereby the smaller of the available power production and the requested power production. Such regulation of the second power-source 30 to generate the smaller of the available power production $P2_A$ and the requested power production $P2_R$ is intended to minimize an amount of time required by the vehicle 10 to complete a full lap of the road course 36.

The controller 34 can also be configured to assess an existence of constraint(s) limiting the total amount of power production $P_T$ by the first and second power-sources 12, 30 after receiving the request for the total amount of power production by the first and second power-sources. A representative constraint limiting the total amount of power production $P_T$ by the first and second power-sources 12, 30 can, for example, be a traction limit at the first set of wheels 14 and/or the second set of wheels 32. The controller 34 can be additionally configured to assess an existence of constraint(s) limiting only power production P2 by the second power-source 30. A representative constraint limiting the amount of power production P2 by the second power-source 30 can, for example, be an operating temperature of the energy storage device 27, second motor-generator 30, the controller 34, or a rotating speed of the subject second electric motor. The subject operating temperature of the energy storage device 27 can be detected via a dedicated sensor (not shown) and communicated to the controller 34. Such assessed constraint(s) limiting power production P2 by the second power-source 30 can be specifically used as a factor in the determination of the available power production $P2_A$ by the second power-source.

The controller 34 may be configured to determine, in real-time, rotating speeds of each of the first set of wheels 14, including individual rotating speeds of the left- and right-side wheels 14-1, 14-2, and of the second set of wheels 32, including individual rotating speeds of the left- and right-side wheels 32-1, 32-2, relative to the road surface 13 when the vehicle 10 is being driven via at least one of the engine 12 and the second motor-generator 30. The rotating speed of each side wheel 14-1, 14-2, 32-1, and 32-2 may be sensed via appropriate individual sensors 37 positioned at the respective wheels and communicated to the controller 34 for signal processing. The controller 34 can also be programmed to determine a road speed of the vehicle 10 on the identified road course 36 relative to the road surface 13, as well as vehicle acceleration, including longitudinal acceleration, i.e., acceleration in the direction along the vehicle axis X, and lateral acceleration, i.e., acceleration in the direction substantially transverse to the subject vehicle axis. The controller 34 may estimate the speed of the vehicle 10 by using the sensed rotating speeds of the side wheels 14-1, 14-2, 32-1, and 32-2.

Alternatively, the controller 34 may be configured to receive via the antenna 34-1 signal(s) from the satellite(s) 35 wherein the signal would provide a more precise determination of the speed of the vehicle 10. The longitudinal acceleration of the vehicle 10 may be sensed and communicated to the controller 34 by an accelerometer 38 positioned on the vehicle 10. The determined road speed of the vehicle 10 can also be used as a factor in the determination of the minimum energy reserve $E_{MIN}$ of the energy source 27 and the maximum target power production $P2_{MAX}$ by the second power-source 30, i.e., in response to the determined road speed. According to the disclosure, the controller 34 is programmed to reduce variation in the performance of the vehicle 10 between individual laps on the subject road course 36 as a result of different states of charge of the energy source 27 at the beginning of every lap. The controller 34 is also configured to adapt to variation in energy usage from the energy storage device 27 for lapping the specific road course 36, as determined via the satellite(s) 35, resulting in reduced variation in performance of the vehicle 10 between individual laps.

The controller 34 can be also programmed to determine a slip of the vehicle 10 relative to the road surface 13. The slip of the vehicle 10 may include a measure of how much the first and second sets of wheels 14, 32 have slipped in a longitudinal direction 40, i.e., in the direction along the vehicle axis X. Specifically, the slip of the vehicle 10 in the longitudinal direction 40 may include a measure of how much any of the individual side wheels 14-1, 14-2, 32-1, and 32-2 has slipped longitudinally, as identified by the discrepancy between the determined speed of the vehicle and the corresponding rotating speed of each particular wheel. The slip of the vehicle 10 may also include a measure of how much any of the side wheels 14-1, 14-2, 32-1, and 32-2 have slipped in a transverse direction 42, i.e., in a direction generally perpendicular to the vehicle axis X, which identifies that the vehicle has deviated from its intended direction or path along the road surface 13. The intended direction of the vehicle 10 may be identified by the steering wheel angle, which can be detected by a sensor 44 operatively connected to the steering wheel 23, communicated to the controller 34, and compared via the controller with the position signal(s) received from the satellite(s) 35.

The controller 34 is additionally programmed to control the slip of the vehicle 10 relative to the road surface 13 via regulating at least one of the respective torque outputs T1 and T2 of the engine 12 and the second motor-generator 30. In accordance with a foregoing description, controlling the slip of the vehicle 10 includes controlling an amount of slip of at least one of the first and second sets of wheels 14, 32 relative to the road surface 13. As noted above, such slip of the first and second sets of wheels 14, 32 may occur relative to the road surface 13 in the longitudinal direction 40. For example, such a situation may develop when drive torque of either the engine 12 or the second motor-generator 30 overcomes the grip of the respective sets of 14, 32 while the vehicle 10 is generally heading in the longitudinal direction 40. As also noted above, slip of the first and second sets of wheels 14, 32 may occur relative to the road surface 13 in the transverse direction 42 generally perpendicular to the vehicle axis X, for example during cornering of the vehicle 10. Slip of either the first set of wheels 14 or the second sets of wheels 32 in the transverse direction 42 sets up a yaw rotation of the vehicle 10 and changes the direction the vehicle is pointing—to the left or to the right of the longitudinal direction 40. As understood by those skilled in the art, a yaw rate of the vehicle 10 is the angular velocity of the yaw rotation, i.e., the rate of change of a heading angle θ, which may be detected via a yaw rate sensor 48 positioned on the vehicle 10.

To control the slip of the vehicle 10 relative to the road surface 13, the controller 34 may be configured to determine the steering wheel angle and a yaw rate of the vehicle via communication with the respective steering wheel angle sensor 44 and yaw rate sensor 48. Furthermore, the controller 34 may be programmed to compare the determined steering wheel angle and yaw rate and regulate the respective torque output T1, T2 from the engine 12 and the second motor-generator 30 to control the yaw rate of the vehicle 10. Such control of the yaw rate of the vehicle 10 is intended to return actual vehicle heading to the desired heading being commanded by the operator at the steering wheel 23, which is generally closer to the longitudinal direction 40.

An increase in torque output T1 from the engine 12 will tend to generate "understeer", or cause the vehicle 10 to steer less than the amount commanded by the operator at the steering wheel 23. On the other hand, an increase in torque output T2 from the second motor-generator 30 will tend to generate "oversteer", or cause the vehicle 10 to steer more than the amount commanded by the operator at the steering wheel 23. Accordingly, varying the respective torque outputs T1, T2 of the engine 12 and the second motor-generator 30 will adjust the attitude of the vehicle 10, depending on whether understeer or oversteer is needed to change the heading angle θ, and bring the vehicle back in line with the desired vehicle heading commanded at the steering wheel 23. In order to adjust the attitude of the vehicle 10, the controller 34 may additionally be configured to arbitrate, i.e., assess, coordinate, and regulate, an appropriate torque split between the first and second sets of wheels 14, 32. Such a torque split between the first and second sets of wheels 14, 32 will generally be arbitrated for the most efficient propulsion of the vehicle 10 consistent with such factors as operator request for acceleration and conditions of the road surface 13.

Consistent with the above, arbitration of the torque split between the first and second sets of wheels 14, 32 is accomplished via regulating the torque output of at least one of the engine 12 and the second motor-generator 30, i.e., output torque T1 and/or output torque T2, in order to control the yaw rate of the vehicle 10. In order to accomplish the subject arbitration of the torque split between the first and second sets of wheels 14, 32, the controller 34 may be configured to start the engine 12 for controlling the slip of the vehicle 10 relative to the road surface 13 when the vehicle is being driven solely by the second motor-generator 30 while the engine is off. Such a situation may arise, if, for example, the vehicle 10 is experiencing excess oversteer and drive torque T1 from the engine 12 would be useful for restoring desired dynamic balance to the attitude of the vehicle.

Figure 3:
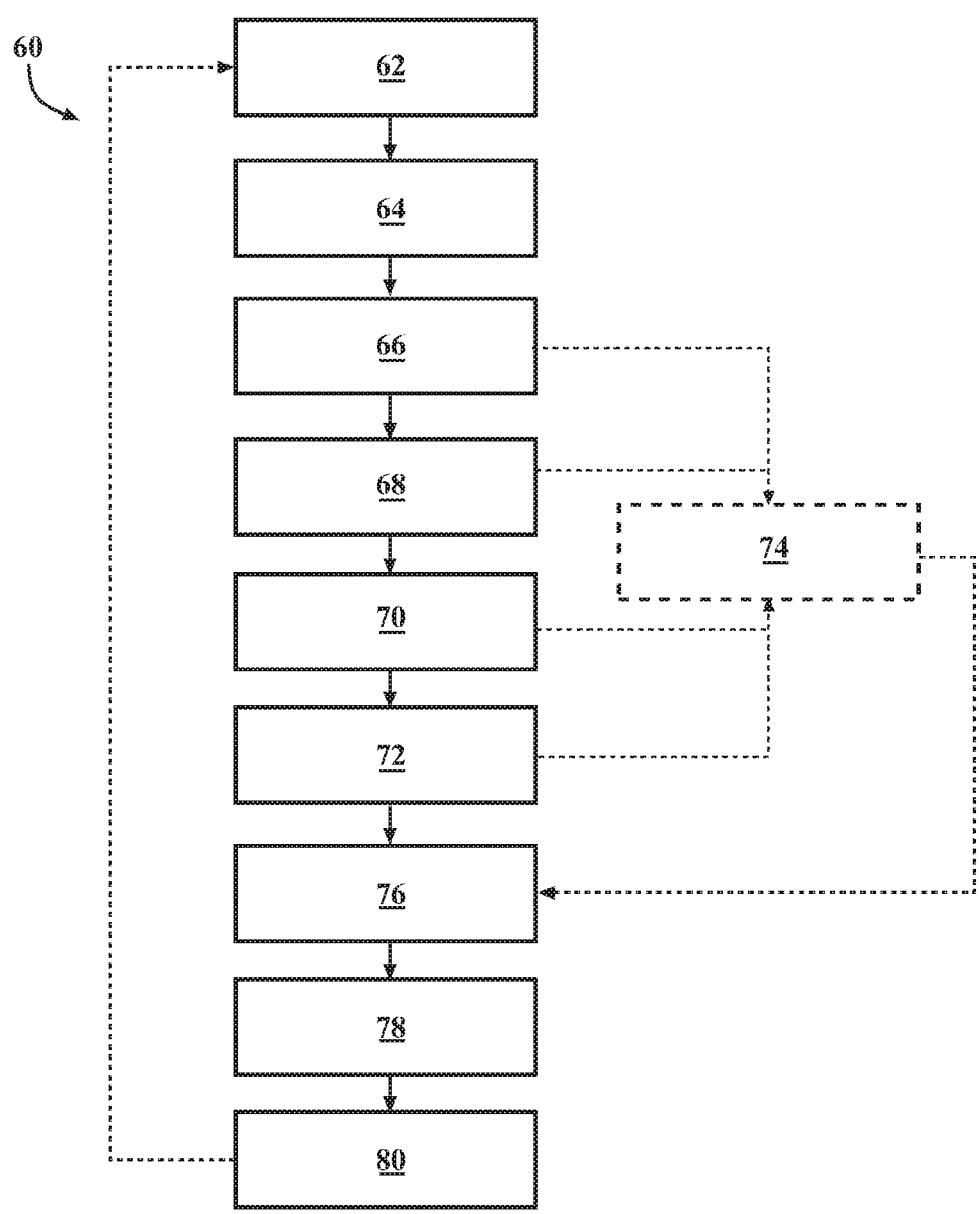
FIG. 3 schematically illustrates a method of controlling operation of the vehicle shown in FIGS. 1 and 2.

FIG. 3 depicts a method 60 of prioritizing power output of the first and second power-sources 12, 30 to control operation of the vehicle 10, as described above with respect to FIGS. 1 and 2. Method 60 commences in frame 62 with driving the vehicle 10 via the power P1 produced by the first power-source 12 through the first set of wheels 14, and then proceeds to frame 64. In frame 64, the method includes identifying the road course 36 and the current position of the vehicle 10 thereon using the established connection with the Earth-orbiting satellite(s) 35. After the road course 36 and the current position of the vehicle 10 have been determined in frame 64, the method proceeds to frame 66, where the method includes receiving a request for the total amount of power production $P_T$ by the first and second power-sources 12, 30.

Following frame 66, the method proceeds to frame 68, where the method includes determining the amount of power P1 currently being produced by the first power-source 12 in response to $P_T$, which is equal to the maximum power currently available from the first power-source that does not exceed $P_T$. After frame 68, the method advances to frame 70, where the method includes determining the maximum target power $P2_{MAX}$ production by the second power-source 30 in response to the identified current position of the vehicle 10. Following frame 70, the method advances to frame 72, where the method includes determining the minimum energy reserve $E_{MIN}$ of the energy source 27 in response to the identified current position of the vehicle 10, and the state of charge of the energy source 27.

As part of frames 70 and 72, the controller 34 may use the look-up table 50, which will include the maximum target power $P2_{MAX}$ production and minimum energy reserve $E_{MIN}$ by the second power-source 30 for the specific road course 36. The look-up table 50 may be stored in the non-volatile memory of controller 34, and calculated separately, off-line, or in advance of the vehicle 10 arriving at the road course 36 to facilitate optimal usage of energy from energy source 27 at specific points on the road course. Such optimal usage of the energy from the source 27 will, in turn, minimize the amount of time the vehicle 10 will require to traverse the entire road course 36, i.e., reduce the total lap time over the subject road course. As described with respect to FIG. 1, the determination of the minimum energy reserve $E_{MIN}$ and the target power production $P2_{MAX}$ by the second power-source 30 can be accomplished in response to, i.e., based on, the determined road speed of the vehicle 10.

After frame 72, the method advances to frame 74, where the method includes determining the available power production $P2_A$ by the second power-source 30 based on the state of charge of the energy source 27 and $E_{MIN}$. The determination of the available power production $P2_A$ by the second power-source 30 can be additionally accomplished based on or in response to the assessed constraint limiting power production by the second power-source. As described above with respect to FIG. 1, the assessed constraint(s) may either be the temperature of the energy source 27, the temperature of the controller 34, as well as the temperature or the rotating speed of the second power-source 30.

Following any of frames 66-72, the method can proceed to frame 74. In frame 74 the method may include assessing a constraint limiting the total amount of power production $P_T$, which may be an instantaneous traction limit at the first set of wheels 14 or at the second set of wheels 32. After either frame 72 or frame 74 the method advances to frame 76, where the method includes subtracting, via the controller 34, the power produced by the first power-source P1 from the requested total amount of power production $P_T$ to determine a requested power production $P2_R$ by the second power-source 30. Following frame 76, the method proceeds to frame 78, where the method includes comparing, via the controller 34, the available power production $P2_A$ and the requested power production $P2_R$ by the second power-source 30. Then, the method moves on to frame 80. In frame 80, the method includes regulating the second power-source 30 to generate the smaller of the available power production $P2_A$ and the requested power production $P2_R$ to minimize the lap time of the vehicle 10 on the road course 36. Following frame 80, the method may loop back to frame 62.

The method 60 is intended to optimize energy discharge from the energy source 27 on a particular road course 36, as determined via the satellite(s) 35, based on the available power production $P2_A$ of the second power-source 30 to minimize the lap time of the vehicle 10 over the entire road course. Such optimization of the energy discharge from the energy source 27 is further intended to reduce variation in the performance of the vehicle 10 between individual laps on the subject road course 36 as a result of different initial states of charge of the energy source. Additionally, the method 60 can apportion the available energy from the energy source 27 during each particular lap of the specific road course 36, such that the energy source does not become depleted prior to the completion of the subject lap by the vehicle 10. In other words, the method 60 can adapt to variation in energy usage by the vehicle 10 for lapping the specific road course 36 with reduced in vehicle performance variation between individual laps.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of prioritizing power output of first and second power-sources in a vehicle comprising:
   identifying, via a controller in communication with an Earth-orbiting satellite, a road course and a current position of the vehicle thereon;
   receiving, via the controller, a request for a total amount of power production by the first and second power-sources;
   determining, via the controller, a current available power production by the first power-source;
   determining, via the controller, a maximum target power production by the second power-source in response to the identified current position of the vehicle;
   determining, via the controller, in response to the identified current position of the vehicle, a minimum energy reserve of an energy source configured to energize the second power-source and a state of charge of the energy source;
   determining, via the controller, an available power production by the second power-source in response to the determined minimum energy reserve and the state of charge of the energy source;
   subtracting, via the controller, the current available power production by the first power-source from the requested total amount of power production to determine a requested power production by the second power-source;
   comparing, via the controller, the available power production and the requested power production by the second power-source; and
   regulating, via the controller, the second power-source to generate thereby the smaller of the available power production and the requested power production to minimize an amount of time for the vehicle to traverse the road course.

2. The method of claim 1, wherein the vehicle is an all-wheel-drive vehicle having a first set of wheels and a second set of wheels, and wherein the first power-source is operatively connected to the first set of wheels of the vehicle and the second power-source is operatively connected to the second set of wheels of the vehicle.

3. The method of claim 2, further comprising: assessing, via the controller, a constraint limiting the current available power production by the first power-source and a constraint limiting the available power production by the second power-source following said receiving the request for the total amount of power production by the first and second power-sources.

4. The method of claim 3, wherein the constraint limiting the current available power production by the first power-source and the constraint limiting the available power production by the second power-source is a traction limit at one of the respective first and second sets of wheels.

5. The method of claim 1, further comprising: determining, via the controller, a road speed of the vehicle on the road course, wherein said determining the maximum target power production by the second power-source is additionally accomplished in response to the determined road speed of the vehicle.

6. The method of claim 5, further comprising: updating current position of the vehicle on the road course, via the controller, using the determined road speed of the vehicle.

7. The method of claim 1, further comprising: assessing, via the controller, a constraint limiting power production by the second power-source.

8. The method of claim 7, wherein said determining the available power production by the second power-source is additionally accomplished in response to the assessed constraint limiting power production by the second power-source.

9. The method of claim 8, wherein the first power-source is an internal combustion engine and the second power-source is an electric motor.

10. The method of claim 9, wherein the constraint limiting power production by the electric motor is one of a temperature of the electric battery, temperature of the controller, temperature of the electric motor, and a rotating speed of the electric motor.

11. A vehicle comprising:
    a first power-source configured to generate power to drive the vehicle;
    a second power-source configured to generate power to drive the vehicle;
    an energy source configured to energize the second power-source; and
    a controller in communication with an Earth-orbiting satellite and configured to:
        identify a road course and a current position of the vehicle thereon when the vehicle is being driven via the power produced by the first power-source;
        receiving, via the controller, a request for a total amount of power production by the first and second power-sources;
        determine a current available power production by the first power-source;

determine a maximum target power production by the second power-source in response to the identified current position of the vehicle;

determine, in response to the identified current position of the vehicle, a minimum energy reserve of an energy source configured to energize the second power-source and a state of charge of the energy source;

determine an available power production by the second power-source in response to the determined minimum energy reserve and the state of charge of the energy source;

subtract the current available power production by the first power-source from the requested total amount of power production to determine a requested power production by the second power-source;

compare the available power production and the determined requested power production by the second power-source; and regulate the second power-source to generate thereby the smaller of the available power production and the requested power production to minimize an amount of time for the vehicle to traverse the road course.

12. The vehicle of claim 11, wherein the vehicle is an all-wheel-drive vehicle further comprising a first set of wheels and a second set of wheels, wherein the first power-source is operatively connected to the first set of wheels of the vehicle and the second power-source is operatively connected to the second set of wheels of the vehicle.

13. The vehicle of claim 12, wherein the controller is additionally configured to assess a constraint limiting the current available power production by the first power-source and a constraint limiting the available power production after the request for the total amount of power production by the first and second power-sources was received.

14. The vehicle of claim 13, wherein the constraint limiting the current available power production by the first power-source and the constraint limiting the available power production by the second power-source is a traction limit at one of the respective first and second sets of wheels.

15. The vehicle of claim 11, wherein the controller is additionally configured to determine a road speed of the vehicle on the road course, and wherein the determination of the maximum target power production by the second power-source is additionally accomplished in response to the determined road speed of the vehicle.

16. The vehicle of claim 15, wherein the controller is additionally configured to update the current position of the vehicle on the road course using the determined road speed of the vehicle.

17. The vehicle of claim 11, wherein the controller is additionally configured to assess a constraint limiting power production by the second power-source.

18. The vehicle of claim 17, wherein the determination of the available power production by the second power-source is additionally accomplished in response to the assessed constraint limiting power production by the second power-source.

19. The vehicle of claim 18, wherein the first power-source is an internal combustion engine and the second power-source is an electric motor.

20. The vehicle of claim 19, wherein the constraint limiting power production by the electric motor is one of a temperature of the electric battery, temperature of the controller, temperature of the electric motor, and a rotating speed of the electric motor.

* * * * *